United States Patent
Leiber et al.

(10) Patent No.: US 6,958,836 B2
(45) Date of Patent: Oct. 25, 2005

(54) HOLOGRAM CARRIER

(75) Inventors: Jörn Leiber, Münsterdorff (DE); Stefan Stadler, Hamburg (DE); Stefan Röber, Hamburg (DE); Steffen Noehte, Weinheim (DE); Christoph Dietrich, Heidelberg (DE)

(73) Assignee: tesa scribos GmbH, Heidelberg (DE)

( * ) Notice: Subject to any disclaimer, the term of this patent is extended or adjusted under 35 U.S.C. 154(b) by 0 days.

(21) Appl. No.: 10/471,911

(22) PCT Filed: Mar. 12, 2002

(86) PCT No.: PCT/EP02/02668
§ 371 (c)(1),
(2), (4) Date: Nov. 17, 2003

(87) PCT Pub. No.: WO02/075459
PCT Pub. Date: Sep. 26, 2002

(65) Prior Publication Data
US 2004/0136037 A1 Jul. 15, 2004

(30) Foreign Application Priority Data
Mar. 16, 2001 (DE) .................. 101 13 392

(51) Int. Cl.⁷ .............................. G03H 1/00
(52) U.S. Cl. ............................. 359/1; 283/72
(58) Field of Search .................. 359/1, 2; 283/72, 283/86, 98, 99

(56) References Cited

U.S. PATENT DOCUMENTS

| | | | |
|---|---|---|---|
| 4,488,042 A | * 12/1984 | Clay et al. | 250/235 |
| 4,889,366 A | * 12/1989 | Fabbiani | 283/86 |
| 5,154,889 A | 10/1992 | Muraishi | 422/65 |
| 5,426,520 A | 6/1995 | Kakae et al. | 359/2 |
| 5,492,370 A | * 2/1996 | Chatwin et al. | 283/110 |

FOREIGN PATENT DOCUMENTS

| | | | |
|---|---|---|---|
| GB | 2 248 943 | | 4/1992 |
| RU | 2032219 | * | 3/1995 |

\* cited by examiner

*Primary Examiner*—Mark A. Robinson
*Assistant Examiner*—Alessandro Amari
(74) *Attorney, Agent, or Firm*—Baker & Daniels

(57) ABSTRACT

The invention relates to a hologram carrier having a hologram surface and a reference surface to facilitate the acquisition of the hologram surface by a device. In this case, provision is made for the reference surface to comprise at least one step, which is arranged to interengage with a complementary formation on the device in order to align said device.

14 Claims, 2 Drawing Sheets

HOLOGRAM CARRIER

BACKGROUND OF THE INVENTION

The present invention relates to a hologram carrier.

Holograms are suitable for storing large amounts of data in a small space. This is advantageous if the area available is small or the design of a product is not to be impaired by identifying information, as is often the case in bar codes or the like.

In principle, it is known that holograms can be inscribed into polymer materials or, if appropriate, can be embossed in by hot embossing or other processes. In this regard, reference is made, for example, to German utility model 298 16 802.2.

Holograms of this type can readily be applied to articles in order to accommodate a large amount of information on the latter in a very small region. For example, holograms of this type on an article can replace the bar code which is widespread in department stores and/or information can be stored on packages, items of mail and the like. Paradoxically, however, one problem arises because of the small size of the hologram, in particular in view of the small visual contrast of the exposed and/or embossed pattern, as compared with untreated, transparent polymer material. Reading the hologram information is consequently made significantly more difficult.

SUMMARY OF THE INVENTION

The object of the present invention is to specify a hologram carrier in which the information contained in the hologram can more easily be found and/or introduced at the correct location.

The object of the present invention is achieved by a hologram carrier according to the independent claim. Preferred embodiments will be found in the subclaims.

A first aspect of the present invention therefore provides a hologram carrier having a hologram surface and a reference surface to facilitate the acquisition of the hologram surface by a device, in which the reference surface comprises at least one step which is arranged to interengage with a complementary formation on the device in order to align said device.

A first basic idea can thus be seen in the fact that, in order to adjust a device on a hologram surface which may possibly be very small, mechanical alignment is permitted, which makes it possible, after the carrier has been found roughly, which may readily be made possible, to bring a reader or writer into approximately the correct position and then to perform the device alignment by means of a step interengaging with a complementary formation on the device. If, as in the case of bar code reading pens, a device which is gripped manually is used, in this way the high sensitivity of the fingertips can be used for the alignment.

The step may be excavated, for example in the form of an embossment and/or a punch-out. This is advantageous since, typically, the thickness of the hologram carrier will be marked by durability considerations, for example resistance to tearing, and then, typically, no additional material has to be applied for the step, increasing the thickness. In an alternative way, however, is also possible to provide the step as an elevated step. This is desirable in particular if the device is to be positioned very quickly and this is to be achieved by the device being pushed over the hologram carrier as far as the step.

In a preferred embodiment, both steps and depressions can be provided. This increases overall the available depth with which the complementary formation provided on the device can interengage.

In a preferred embodiment, both elevated steps and depression steps can be provided. This increases overall the available depth with which the complementary formation provided on the device can interengage.

The hologram carrier of the present invention can comprise steps which are formed by relief embossments, punch-outs and/or laser machining and can therefore be produced without problems as a mass product.

The hologram carrier will be formed, at least partially, from a polymer material. In particular, in a preferred exemplary embodiment, at least the hologram surface will be formed of polymer material. Preferred polymer materials are, for example, oriented PMMA and the like.

In a first preferred case, the hologram surface will constitute a free surface provided for the production of a hologram; said surface can be inscribed by means of a reader/writer interengaging with the step or steps. In an alternative way or additionally, the hologram surface can also have a finished hologram, for example in order to provide a product identification as in the case of a bar code or a verification of origin.

It is also possible to provide a plurality of hologram patterns beside one another, of which some or at least one are/is prefabricated. Thus, for example, for package services or the like, postage information can be pre-coded and, after the hologram carrier has been stuck to a package or a letter, address information can be written in, to be specific, preferably beside the pre-inscribed hologram surface. Writing beside the pre-inscribed hologram surface facilitates the calculation of the hologram pattern needed to encode the data to be stored.

The hologram carrier can be designed to be self-adhesive, in particular self-adhesive on the rear side, in order to be affixed to an object such as a package or another product to be identified. It should be mentioned that there is the possibility, for example if a roll with separable hologram carriers is provided, to pre-inscribe these on the roll and/or to introduce a hologram during the roll production.

The embossment can be used at the same time for alignment of a predefined rotational angle.

In a preferred exemplary embodiment, the hologram carrier will further have placement surfaces, on which the device can be placed on the hologram carrier, aligned by means of the step. In particular, the steps can be configured as trough-like depressions or block-like elevations which, in particular, have edges falling away at least virtually at right angles, in order to interact with a complementary formation penetrating them.

The steps and/or placement surfaces can be oriented and formed in such away that a series of different readers can be aligned, to be specific, in each case such that only individual parts of the hologram pattern or different hologram surfaces can be read.

Protection is also claimed for writers and/or readers which are designed for the complementary interengagement with the hologram carrier.

BRIEF DESCRIPTION OF THE DRAWINGS

The invention will be described below, merely by way of example, by using the drawing, in which.

DETAILED DESCRIPTION

Figure 1:
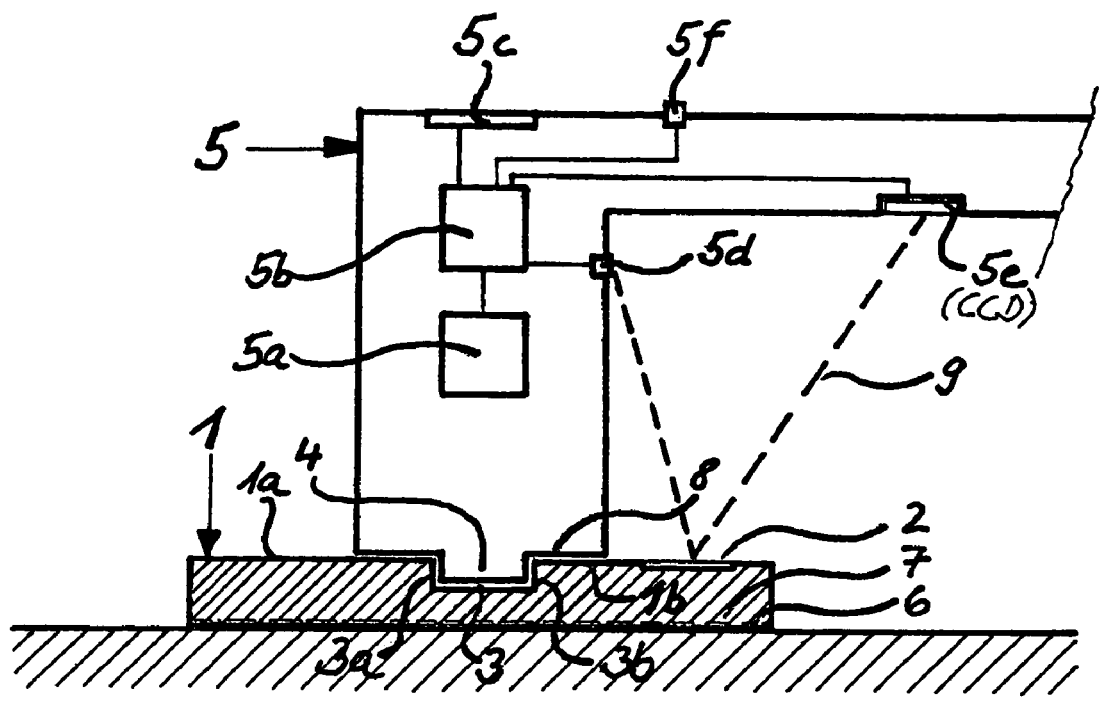
FIG. 1 shows a hologram carrier according to the invention on a background with a device put in place.
Figure 2:
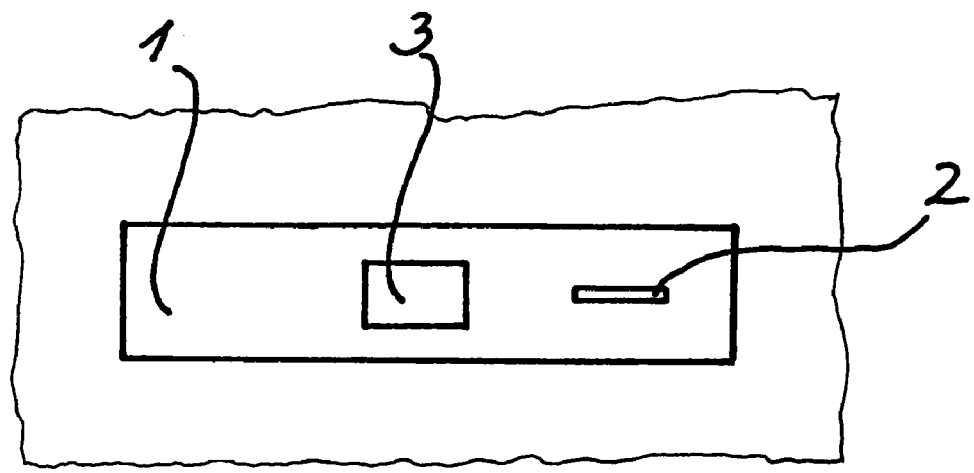
FIG. 2 shows a plan view of the hologram carrier.

According to FIG. 1, a hologram carrier 1 designated generally by 1 comprises a hologram surface 2, on which a hologram is embossed, and a step 3 for alignment of a complementary formation 4 on a device 5 for reading the hologram 2.

The hologram carrier 1 is formed from transparent PMMA and, on its rear side 6 facing away from its depression 3 and the hologram surface 2, is provided with an adhesive layer 7. The hologram carrier 1 has a thickness of a total of 1 mm (not illustrated true to scale in FIG. 1), the depression 3 having a depth of 0.5 mm. The edges 3a, 3b of the step 3 are perpendicular to the general surface 1a of the hologram carrier 1.

The projection 4 on the device 5 is designed for complementary, play-free interaction with the depression 3. In the region around the complementary formation 4, the reader 5 has supporting surfaces 8 which are intended to rest on the regions 1b of the hologram carrier that surround the depression 3. The device 5 has an internal power source 5a in the form of an accumulator, a central controller 5b, an LCD display matrix 5c and also a laser light source 5d and a CCD 5e, an actuating knob 5f being provided in order to activate the apparatus.

The laser light source 5d is aligned in such a way that, when the complementary formation 4 is inserted into the depression 3, the beam 9 emitted by said source streams onto the hologram surface in such a way that a pattern reproduced from the hologram, that is to say a reconstructed pattern, is produced on the CCD 5e.

The hologram carrier and the reader of the present invention are used as follows: Firstly, a hologram carrier with a prefabricated hologram is affixed to a background by using its self-adhesive layer 7 on the rear side 6.

In order to read the information, the reader 5 is then placed roughly where the carrier 1 with the depression 3 is detectably located. The complementary formation 4 of the device is then moved in the direction of the depression 3. As soon as the user of the device 5 detects that the complementary formation 4 is interengaged with the depression 3, the knob 5f is operated in order to excite the laser light source 5d, whereupon a laser light beam 9 falls on the hologram, which is very narrow and which is barely perceptible or even imperceptible to the naked eye, in such a way that a hologram pattern is projected onto the CCD 5e. The hologram pattern received at the CCD 5e is evaluated in the control and processing unit 5b and information based on said pattern is displayed on the LCD matrix. As soon as the user has read the LCD information, the device is deactivated by releasing the knob 5f.

It should be mentioned that the device does not necessarily have to be operated manually and that, in particular, it is also possible to bring a reader and/or writer into interengagement with a step on a hologram carrier by machine. Furthermore, it should be pointed out that the hologram surface does not necessarily have to be separated from the step; in particular, the hologram surface can be provided within a depression, for example when the recess and the hologram prefabrication are carried out by hot embossing in polymer material. It should moreover be mentioned that the beam geometry illustrated was selected only by way of example and for graphical reasons.

Figure 3:
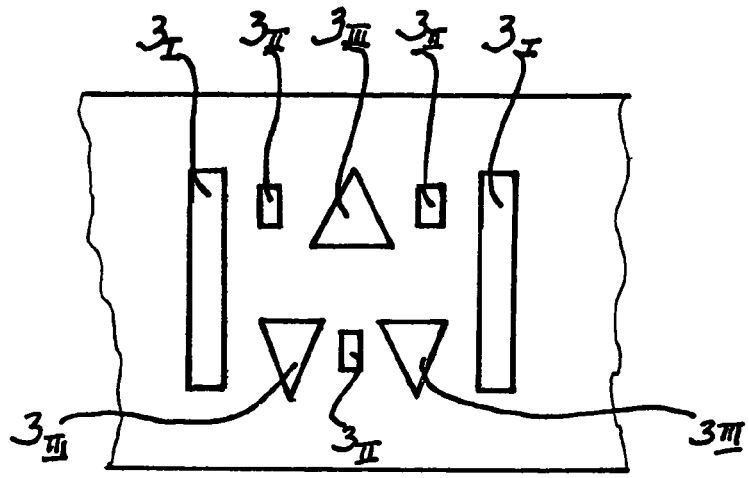
FIG. 3 shows an arrangement of different depressions forming steps on a hologram carrier.
Figure 4:
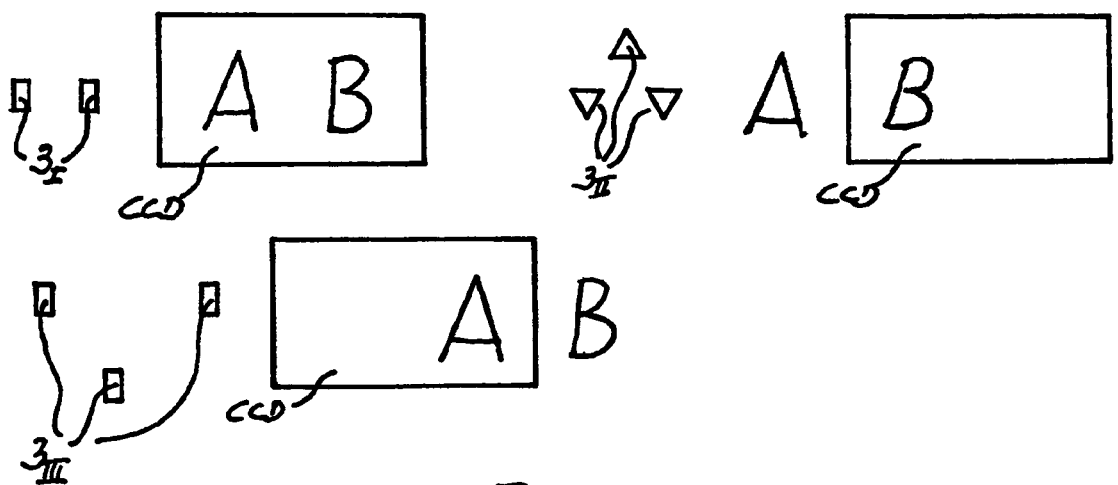
FIG. 4 shows examples of the different alignment of CCDs relative to a hologram pattern AB on the basis of the complementary formations provided on the device to interengage with the steps of FIG. 3.

A preferred development of the invention is illustrated in FIG. 3. Here, three sets of different depressions 3 are provided on the hologram carrier 1, namely the depressions $3_I$, $3_{II}$, and the depressions $3_{III}$. Associated with each of these groups of steps is a reader, in which the laser light source 5d radiates onto the hologram surface 2 at the same angle, but the CCD 5e, as indicated for a hologram pattern "AB" in FIG. 4, in each case being displaced such that either the complete hologram pattern can be acquired (case $3_I$) or only a part of the same (cases $3_{II}$ and $3_{III}$). Such an arrangement is expedient to prevent unauthorized persons being able to read all the information contained in the hologram; this is possible only with suitable readers $3_I$. It should be pointed out that, instead of a displacement of the CCD, there are other possibilities of preventing all the information being read out completely by unauthorized persons, using coding by means of the steps.

Figure 5:
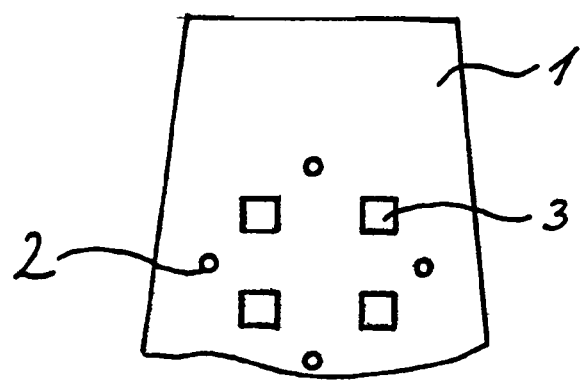
FIG. 5 shows a hologram carrier according to the present invention with increased data security.

A hologram carrier for particularly rough conditions is illustrated in FIG. 5. Here, the steps 3 on the hologram carrier 1 are arranged symmetrically and four spaced-apart hologram surfaces each having identical holograms are provided. In this way, should one of the four hologram surfaces become completely illegible, for example as a result of impact, contamination or the like, by means of simply rotating the reader in a direction offset through 90° with respect to the starting position, it is possible to ensure that the redundantly provided information can still readily be read. The small size of the holograms in this case allows a still small surface of the hologram carrier to be admitted with, nevertheless, a high information content, in spite of the redundant provision of said holograms.

It should be mentioned that the step can be implemented other than by a depression. An elevated step can also be provided instead.

What is claimed is:

1. A hologram carrier, comprising:
   a hologram surface for storing hologram encoded information;
   a reference surface to facilitate acquisition of the hologram surface by a device, the reference surface comprising a plurality of steps arranged to interengage with a complementary formation on an access device so that the device becomes aligned to access at least some of the hologram surface;
   wherein said plurality of steps comprises different groups of steps, the groups of steps being oriented and formed such that a given specific access device, when the complementary formation thereof and a selected group of steps are interengaged, becomes aligned to access only specified parts of a hologram surface while access to other parts of the hologram surface with said specific device is prevented.

2. A hologram carrier according to claim 1, wherein the hologram surface comprises a pre-fabricated hologram pattern.

3. A hologram carrier according to claim 2, wherein a complete hologram pattern is provided, said selected group of steps is adapted to interengage with one specific access device of a group of different access devices, the selected group of steps being oriented and formed such that a given specific access device becomes aligned to access only specific parts of the information encoded in the hologram pattern.

4. A hologram carrier according to claim 3 wherein the given specific access device is a hologram reader.

5. A hologram carrier according to claim 3 made of polymer material.

6. A hologram carrier according to claim 2 wherein the given specific access device is a hologram reader.

7. A hologram carrier according to claim 2 made of polymer material.

8. A hologram carrier according to claim 1, wherein the hologram surface comprises a free surface for the production of a hologram, at least one group of said steps being adapted to align a writer for inscribing information at the free surface.

9. A hologram carrier according to claim 8, wherein a complete hologram pattern is provided, said selected group of steps is adapted to interengage with one specific access device of a group of different access devices, the selected group of steps being oriented and formed such that a given specific access device becomes aligned to access only specific parts of the information encoded in the hologram pattern.

10. A hologram carrier according to claim 9 made of polymer material.

11. A hologram carrier according to claim 1, wherein a complete hologram pattern is provided, said selected group of steps is adapted to interengage with one specific access device of a group of different access devices, the selected group of steps being oriented and formed such that a given specific access device becomes aligned to access only specific parts of the information encoded in the hologram pattern.

12. A hologram carrier according to claim 1 wherein the given specific access device is a hologram reader.

13. A hologram carrier according to claim 12 made of polymer material.

14. A hologram carrier according to claim 1 made of polymer material.

* * * * *